US009077166B2

(12) United States Patent
Dinh (10) Patent No.: US 9,077,166 B2
(45) Date of Patent: Jul. 7, 2015

(54) WEATHERPROOF ELECTRICAL BOX (75) Inventor: Cong Thanh Dinh, Collierville, TN (US)

(73) Assignee: Thomas & Betts International LLC, Wilmington, DE (US)

(*) Notice: Subject to any disclaimer, the term of this patent is extended or adjusted under 35 U.S.C. 154(b) by 196 days.

(21) Appl. No.: 13/072,829

(22) Filed: Mar. 28, 2011

(65) Prior Publication Data
US 2011/0240363 A1 Oct. 6, 2011

Related U.S. Application Data (60) Provisional application No. 61/319,304, filed on Mar. 31, 2010.

(51) Int. Cl.
*H01R 13/533* (2006.01)
*H02G 3/08* (2006.01)
*H02G 3/12* (2006.01)
*H02G 3/18* (2006.01)

(52) U.S. Cl.
CPC .............. *H02G 3/088* (2013.01); *H02G 3/121* (2013.01); *H02G 3/185* (2013.01)

(58) Field of Classification Search
CPC ............ H02G 3/08; H02G 3/14; H02G 3/18; H02G 3/088; H02G 3/185
USPC ........... 174/551, 50, 53, 67, 481, 57, 58, 480, 174/559; 361/755, 800; 220/3.2–3, 4.029
See application file for complete search history.

(56) References Cited

U.S. PATENT DOCUMENTS

| | | | |
|---|---|---|---|
| 904,898 A | 11/1908 | Russell | |
| 3,972,579 A | 8/1976 | Kohaut | |
| 4,355,197 A | 10/1982 | Jonsson | |
| 4,381,063 A | 4/1983 | Leong | |
| 4,654,470 A | 3/1987 | Feldman et al. | |
| 4,656,798 A | 4/1987 | Hazen | |
| 4,950,842 A * | 8/1990 | Menninga | 174/67 |
| 4,984,982 A | 1/1991 | Brownlie et al. | |
| 5,122,069 A | 6/1992 | Brownlie et al. | |
| 5,179,252 A | 1/1993 | Yang | |
| 5,310,075 A | 5/1994 | Wyler | |
| 5,342,993 A | 8/1994 | Siems | |
| 5,834,694 A | 11/1998 | Bakker et al. | |
| 6,200,155 B1 * | 3/2001 | Chudkosky et al. | 439/371 |
| 6,610,927 B2 | 8/2003 | Dinh et al. | |
| 6,629,619 B2 | 10/2003 | Sato et al. | |
| 6,669,041 B2 | 12/2003 | Almond | |
| 6,835,890 B2 | 12/2004 | Dinh et al. | |
| 7,105,745 B2 | 9/2006 | Drane et al. | |
| 7,157,643 B2 * | 1/2007 | Drane | 174/66 |
| 7,276,662 B2 | 10/2007 | Drane | |
| 7,301,100 B2 | 11/2007 | Drane et al. | |
| 7,837,156 B1 * | 11/2010 | Handler | 248/58 |
| 8,013,242 B1 * | 9/2011 | Thibault et al. | 174/53 |
| 2002/0134568 A1 * | 9/2002 | Dinh et al. | 174/50 |

* cited by examiner

*Primary Examiner* — Timothy Thompson
*Assistant Examiner* — Paresh Paghadal
(74) *Attorney, Agent, or Firm* — Snyder, Clark, Lesch & Chung, LLP (57) ABSTRACT

A weatherproof electrical box may include a housing having a first enclosure volume and an opening to the first enclosure volume. A cover may be connected with the housing to cover the opening. A cable configuration element may extend from the cover and into the first enclosure volume. The cable configuration element may retain a cable connected with a device mounted in the housing in a downwardly extending surface configuration when the cover covers the opening.

19 Claims, 10 Drawing Sheets

WEATHERPROOF ELECTRICAL BOX

CROSS-REFERENCE TO RELATED APPLICATION

This application claims priority under 35. U.S.C. §119, based on U.S. Provisional Patent Application No. 61/319,304 filed Mar. 31, 2010, the disclosure of which is hereby incorporated by reference herein.

BACKGROUND INFORMATION

Electrical boxes are often mounted vertically in walls prior to completion of the wall structure to provide a housing for electrical devices and wiring that may be used for telephone, video, and networking, among other utility and communication uses. For example, an electrical box may be mounted on a wall stud prior to drywall installation, thus providing an electrical housing within the wall for the termination of electrical cable and the connection of the cable wiring to a mounted electrical outlet.

In outdoor applications, electrical boxes are often mounted vertically to a wall or other structure to supply electricity in an outdoor setting. Some traditional installations may provide a box that houses an electrical outlet mounted to the vertical surface of an exterior wall. A cover may be provided over outdoor electrical outlet receptacles to help protect the outlet from rain, snow and other environmental conditions. The cover allows access to the outlet receptacles in order to plug in a male electrical fitting of an electrical cord or device into a receptacle. In some installations the electrical box may be mounted within the exterior wall and a cover provided over the outlet receptacles.

DETAILED DESCRIPTION OF PREFERRED EMBODIMENTS

The following detailed description refers to the accompanying drawings. The same reference numbers in different drawings may identify the same or similar elements.

As described herein, an electrical box of the present invention may be conveniently installed in a horizontal orientation, and in some implementations installed within a horizontal surface, such as a deck or other outdoor flooring. The electrical box may also be installed for indoor applications and in orientations other than horizontal.

Implementations described herein provide features directed to weatherproofing devices and any wiring or circuitry that may be mounted within an electrical box, such as electrical receptacles, communication ports, circuitry, and the like, while accommodating electrical connection from the devices to the exterior of the electrical box. As described below, exemplary configurations may prevent water from migrating into and through the electrical box to the devices and wiring mounted therein, water that may originate from the external environment or that might form within the electrical box. Implementations described herein may also provide a weatherproof electrical box that accommodates an electrical fitting, such as a male two or three-pronged plug, as well as cable or cord extending from the electrical fitting to areas external of the electrical box. This may allow for electrical connection from the device to the exterior of the electrical box, while protecting the enclosed device and the electrical connection extending from the device. Additionally, embodiments described herein are directed to processes of weatherproofing electrical devices.

Figure 1:
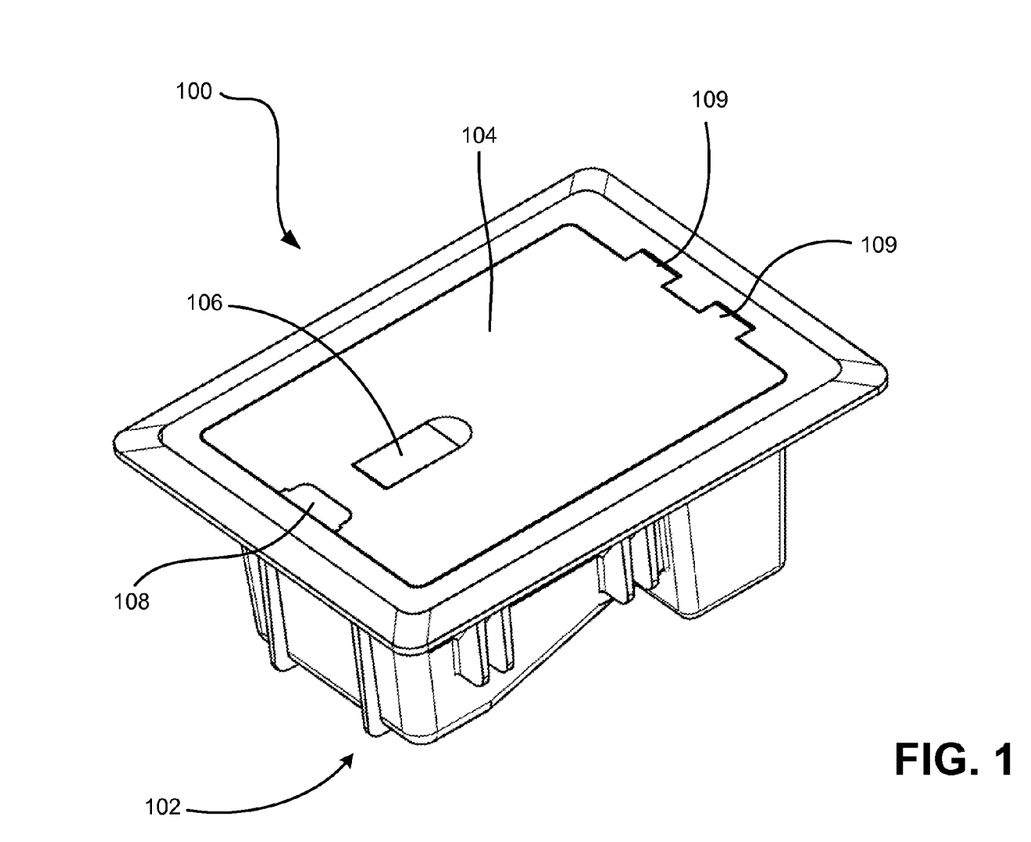
FIG. 1 illustrates an isometric view of an exemplary electrical box.
Figure 2:
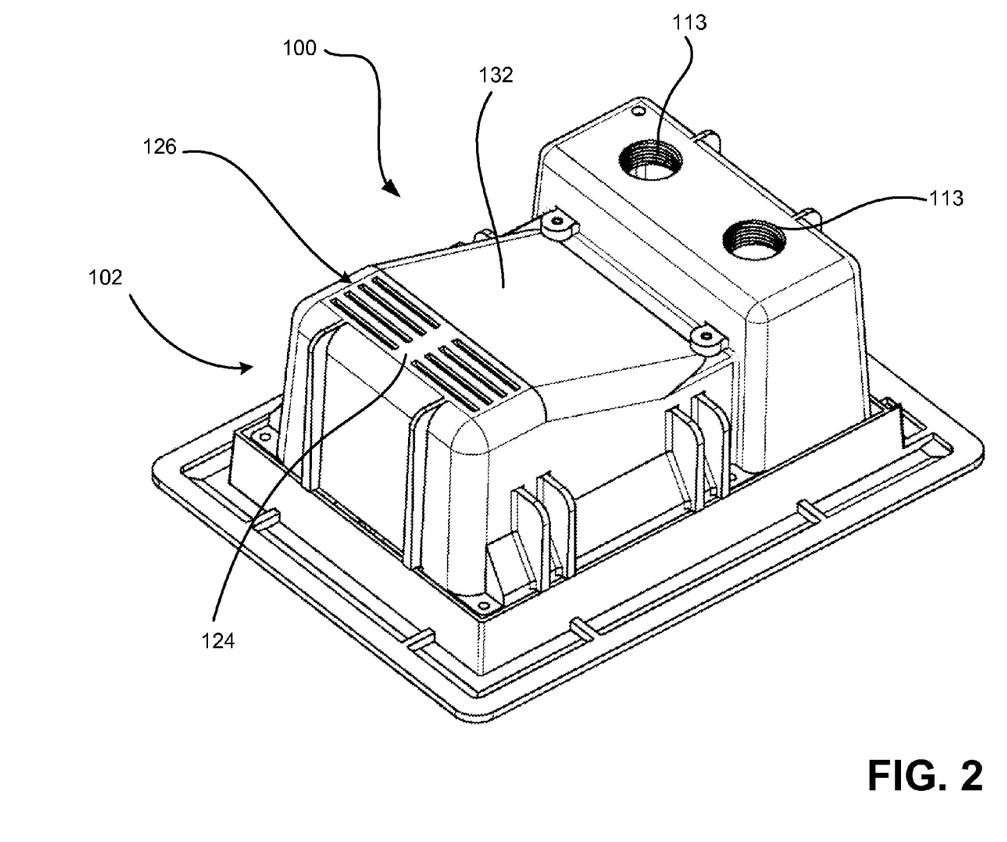
FIG. 2 is a front bottom isometric view of the electrical box of FIG. 1.
Figure 3:
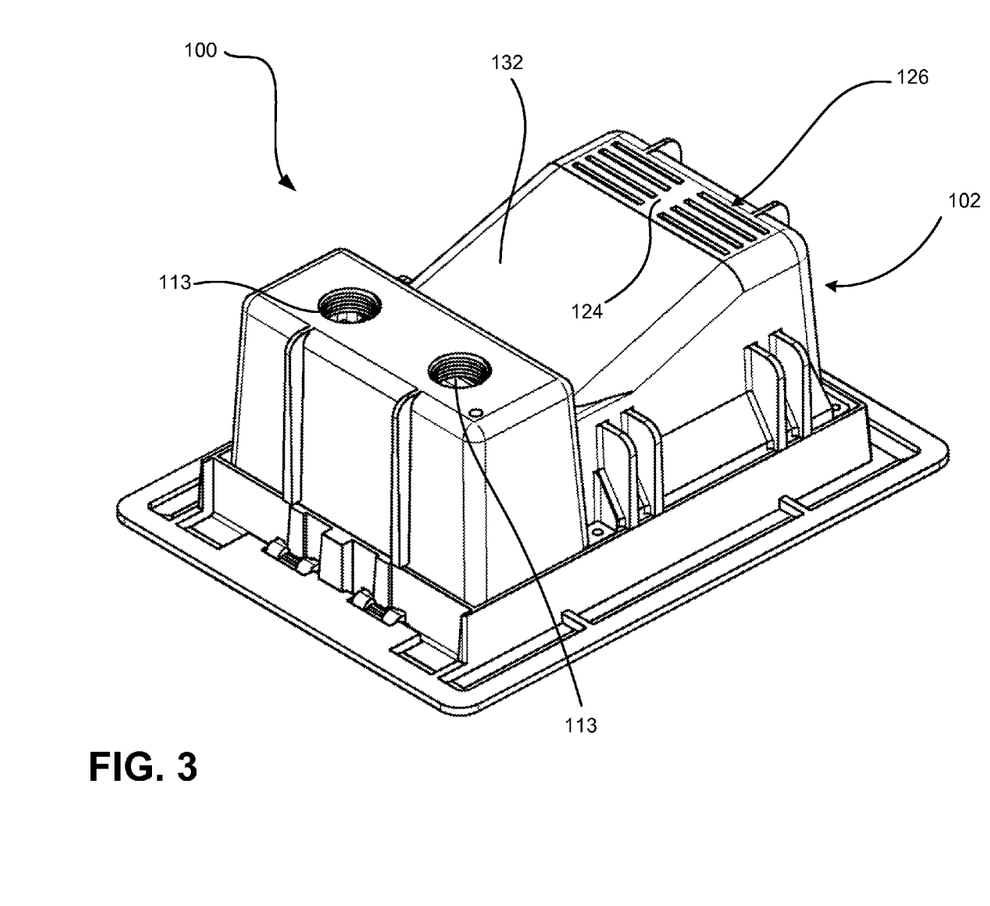
FIG. 3 is a back bottom isometric view of the electrical box of FIG. 1.

FIG. 1 illustrates an exemplary electrical box 100 having a housing 102 and a cover 104. Electrical box 100 may be associated with one or more electrical functions (e.g. a switch box, a gang box, an outlet box, etc.) and may provide an enclosure for one or more devices such as implementations described herein. The device may be an electrical device and have associated wiring, wireless connections or circuitry. The device may also have one or more applications for electrical power supply, telephone, video, or networking, among other utility and communication uses.

In one embodiment, electrical box 100 may serve as an outlet box and enclose one or more devices, such as female electrical outlets or other electrical receptacles, and any associated electrical wiring or circuitry. Depending on the implementation, electrical box 100 may include fewer, additional, or different devices or components than those illustrated in the figures (for example, a networking port, telephone jack, television cable connection, fiber optic connections, and wiring or circuitry, etc). In addition, although electrical box 100 can be associated with various electrical functions (e.g., a switch box, a gang box, etc.), for the purpose of simplicity and ease in understanding, as well as to illustrate one embodiment of the invention, electrical box 100 is described in terms of an electrical outlet box.

Housing 102 of electrical box 100 encloses the one or more mounted devices within electrical box 100 and any wiring or circuitry, providing a weatherproofing function for the device and the wiring and circuitry. In reference to FIG. 6, two enclosure volumes 110, 112 are defined by the walls and interior surfaces of housing 102 and cover 104. Walls of housing 102 between the two enclosure volumes may also serve to aid in mounting a device 114 within electrical box 100. The walls may be configured for a particular device 114 to be installed within housing 102 and an electrical fitting 116. Electrical fitting 116 illustrated in this exemplary embodiment includes a male plug of a power cord or other electrical connection element.

Device 114 may be mounted within the enclosure volume 112 of housing 102. Embodiments described herein may include additional wiring and circuitry to device 114. In the exemplary electrical box illustrated in the figures, device 114 includes a female electrical outlet comprising two receptacles, which would be connected to a common electrical cable and cable wiring to provide electrical connection with an external power source. Access elements (also referred to as "punch out holes") 113 of housing 102 may be used to run electrical cable or wiring to device 114 through housing 102 and into enclosure volume 112, allowing the cable and wiring to be connected to device 114. Access into the interior of housing 102 and enclosure volume 112 in some implementations may be afforded by punch out portions of the housing or other access elements. Access elements 113 may include punch out holes provided in housing 102 of electrical box 100 and may, based on the implementation, be formed in the bottom surface, side walls, or back wall of housing 102. Cable, such as NM (nonmetallic) or other cable and wiring may be connected to device 114 through the punch out hole(s) 113. The cable may be installed in a traditional manner relative to the punch out hole 113 so as to insulate the cable, close/seal the punch out hole 113 and maintain isolation of volume 112 from the environment external to electrical box 100. Accordingly, enclosure volume 112 may be environmentally isolated from the external environment of electrical box 100.

Housing 102 and cover 104 of electrical box 100 enclose the one or more mounted devices and any wiring or circuitry within enclosure volume 112, providing a weatherproofing function for the device and the wiring and circuitry. The isolation of volume 112 from the environment external to electrical box 100 is maintained even when cover 104 is open and enclosure volume 110 is accessible external of electrical box 100, as exemplified in FIG. 4. In reference to FIGS. 4 and 6, enclosure volume 112 is defined by the walls and interior surfaces of housing 102 and cover 104, including upper enclosure wall 115. Upper enclosure wall 115 encloses the one or more mounted devices and any wiring or circuitry within enclosure volume 112 and does not open enclosure volume 112 to the external environment or to enclosure volume 110 upon the opening of cover 104.

Referring back to FIG. 1, cover 104 may include latch 106 for use in opening cover 104 relative to housing 102. Latch 106 may secure cover 104 to housing 102 in a closed configuration of cover 104 and may allow cover 104 to be opened for access to enclosure volume 110, the receptacle of device 112, and a connected electrical fitting 116. Cover 104 assists to retain the environmental isolation of the enclosure volume 110 from environmental conditions exterior of electrical box 100, and may provide additional environmental isolation of enclosure volume 112. In the exemplary embodiment, a user may lift latch 106, releasing internal locking mechanisms of the cover 104 (not shown) in some implementations, and open cover 104 by rotating the cover about hinge elements 109.

Figure 4:
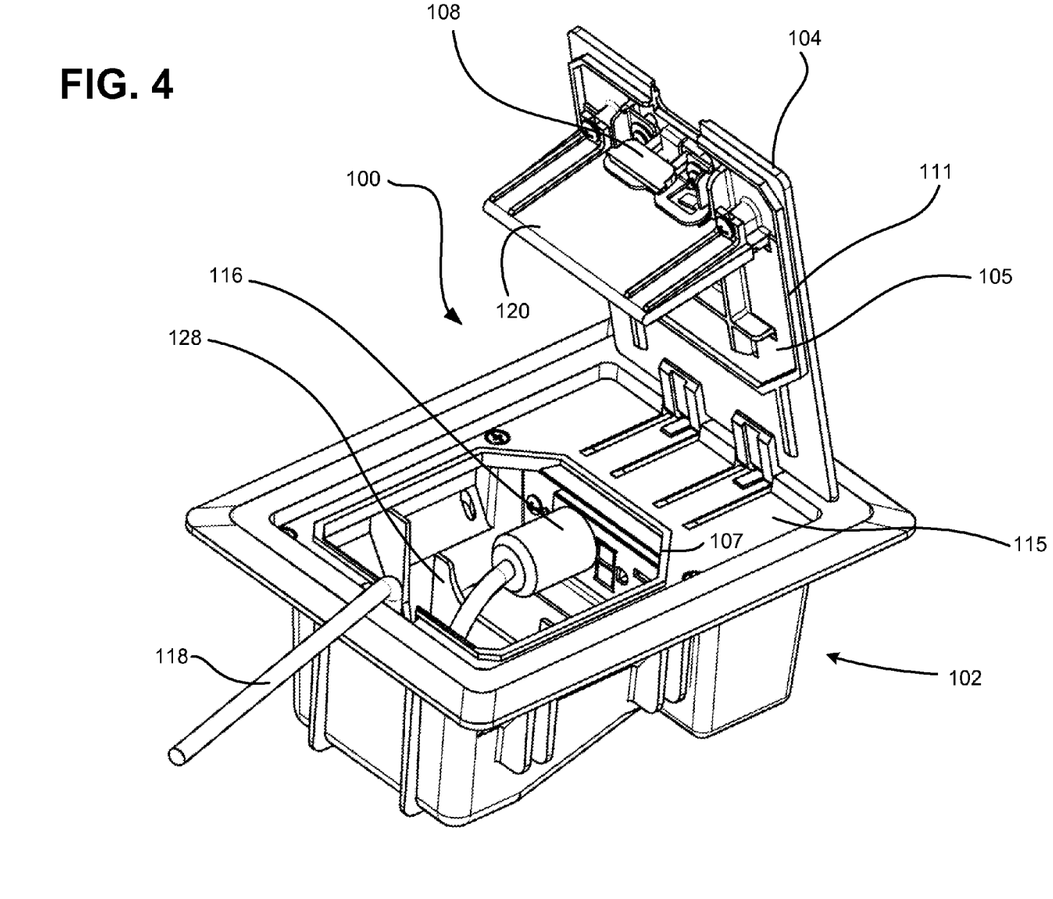
FIG. 4 illustrates an embodiment of the electrical box of FIG. 1 with the cover open.
Figure 5:
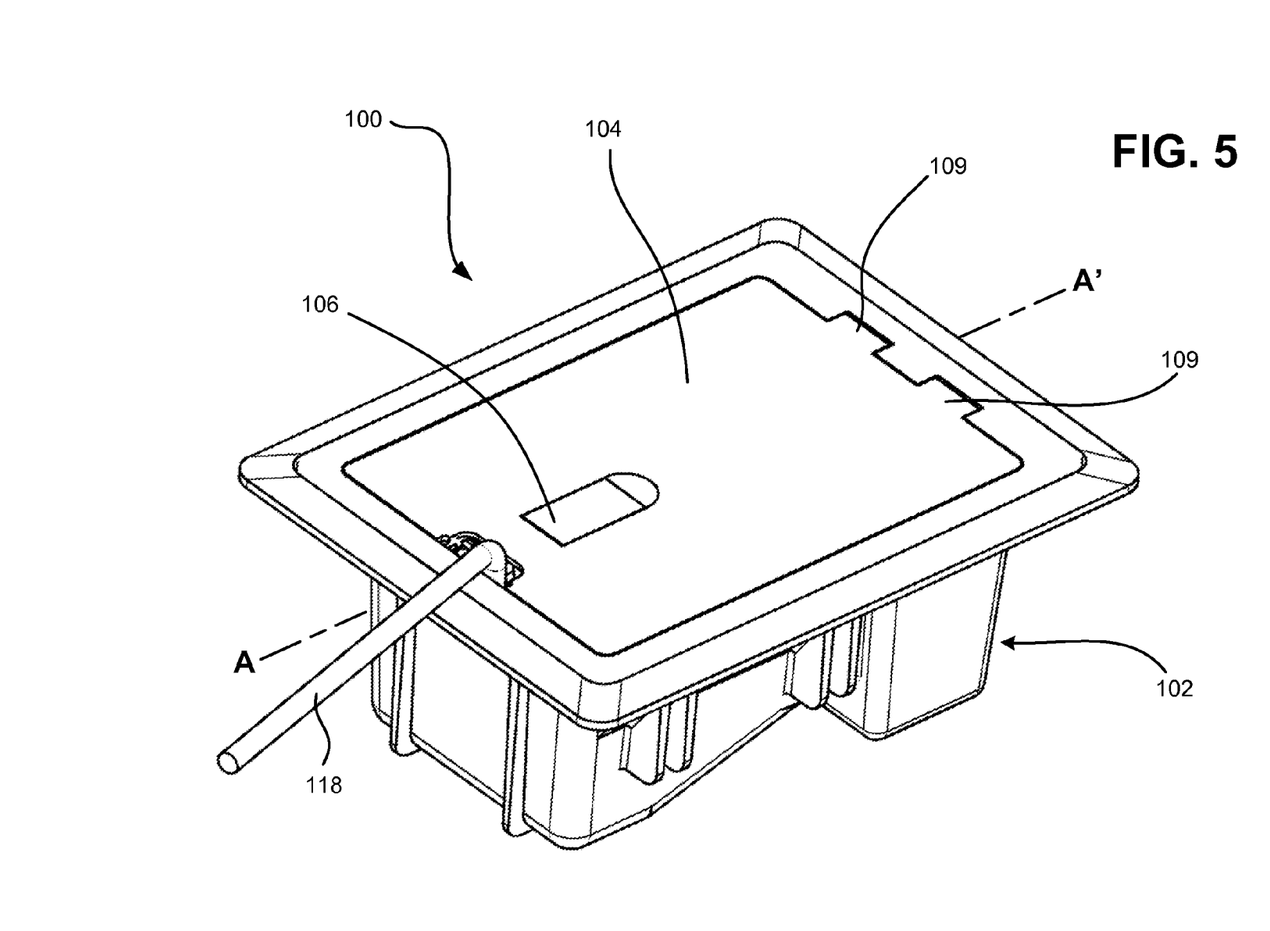
FIG. 5 illustrates an embodiment of the electrical box of FIG. 1 with the cover closed.

As shown in FIG. 1, cover 104 may include a cable door 108 to allow cable or other wiring, conduit or the like of electrical fitting 116 to be run through cover 104. Cable door 108 may be opened, as shown in FIGS. 4 and 5, so that a cable 118 connected with fitting 116 may be accommodated by electrical box 100 when cover 104 is closed. Cable door 108, when closed, as illustrated in FIG. 1, serves to further retain the environmental isolation of the enclosure volume 110 from environmental conditions exterior of electrical box 100, such as when an electrical fitting 116 is not connected to device 114. However, even when the cable door 108 is opened, insulative elements may be used in some implementations, such as material restricting the opening of cable door 108, that further assists retaining the environmental isolation of the enclosure volume 110 from environmental conditions exterior of electrical box 100. Exemplary insulative elements may include a gasket that allows cable 118 to run through the opening of cable door 108 while restricting the opening of the cable door surrounding the cable. The gaskets might be connected with cover 104 or housing 102. The gasket or other insulative element may accommodate cable 118 of electrical fitting 116 when installed to electrical box 100 and assist in retaining the environmental isolation of enclosure volume 110 when cover 104 is closed.

Furthermore, gaskets or other insulative elements may be provided to further assist retaining the environmental isolation of enclosure volume 110 from environmental conditions exterior of electrical box 100. In some embodiments, as shown in FIG. 4, a gasket 111 may be provided on the interior surface 105 of cover 104, and preferably corresponding to interlocking elements 107 of cover 104 and housing 102, so as to retain the environmental isolation of enclosure volume 110 when cover 104 is in a closed configuration. Gasket 111 may also be used to restrict or insulate the opening of cable door 108. Gasket 111 may be formed of a resilient material configured to provide a seal between cover 104 and housing 102, when compressed. Other gaskets or insulative elements may be used corresponding to cover 104 and housing 102 in order to achieve weatherproofing and prevent water migration into electrical box 100.

In outdoor applications, water may nonetheless migrate into the enclosure volume 110, or moisture and condensation can form within enclosed volume 110, depending upon environmental conditions and given that a cable may extend through cover 104. For example, electrical box 100 may be installed in decking that is exposed to rain or snow, and despite the use of cover 104 and insulative elements such as gaskets, water may migrate along cable 118 due to gravity, water surface tension and other factors that allow migration into enclosure volume 110. Water that is present within enclosed volume 110 on cable 118 could continue to migrate along cable 118 to electrical fitting 116 and device 114. Water and other moisture that reach the fitting 116 and device 114 may create conditions that could result in damage to device 114 and fitting 116, and even damage or disruption of the electrical circuit.

However, an orientation and configuration of cable 118, and one providing a downwardly extending surface of at least a portion of cable 118 within enclosure volume 110, will direct migrating water along cable 118 to the bottom surface of enclosure volume 110. Accordingly, shown in FIG. 6, cable 118 may be formed into a loop 122 and retained in that configuration by electrical box 100 to facilitate water migrating along downwardly extending surface 121 of cable 118 to respond to gravitational forces and drip to the bottom surface 124 of housing 102. Water that collects at the bottom surface 124 may then migrate out of the enclosure volume 110 by way of openings 126 in housing 102.

Figure 6:
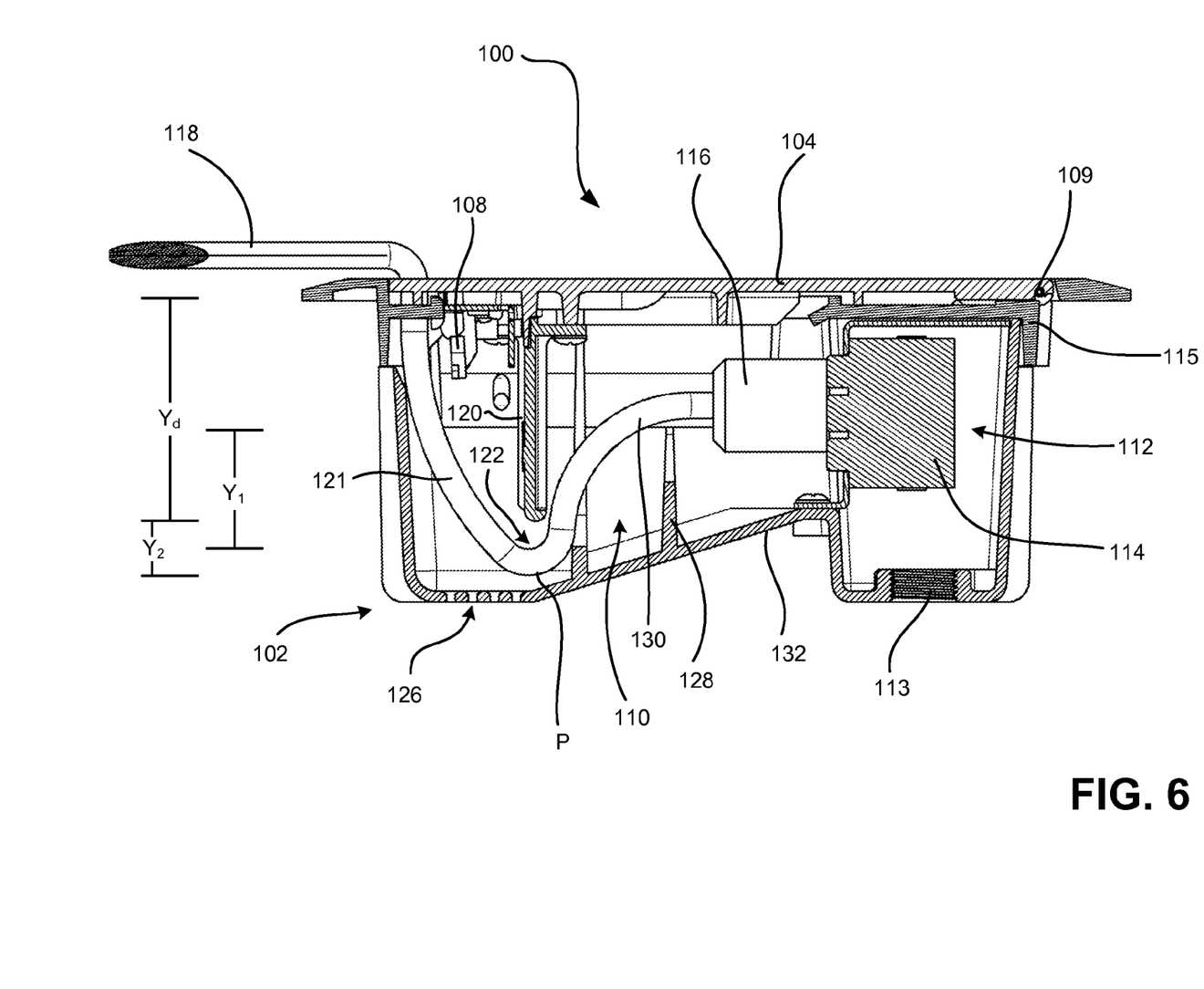
FIG. 6 is a cross sectional view of the electrical box of FIG. 5.

Consistent with implementations described herein, a cable configuration element 120 may be provided to facilitate the dripping, collection, and flow of water out of enclosure volume 110 due, at least in part, to water migration along cable 118. As shown in FIGS. 4 and 6, cable configuration element 120 may aid in creating loop 122 in cable 118 and to further retain the cable in the loop configuration when cover 104 is closed. As illustrated in FIG. 4, cable configuration element 120 may depend from, and in some implementations be integral with, cover 104 and extend into enclosure volume 110 when cover 104 is in a closed configuration. For example, cable configuration element 120 may depend from cover 104 and extend into enclosure volume 110 a distance $Y_d$ sufficient to move a portion of cable 118 downward relative to an inside surface of cover 104 to form or retain loop 122 in cable 118. Loop 122 and downwardly extending surface 121 may be retained in the preferred shape and configuration illustrated in FIG. 6 by cable configuration element 120 upon closing cover 104. Other configurations of cable 118 may also be formed if desired; however, having the surface 121 of cable 118 extended downwardly facilitates drip formation of water migrating along cable 118.

As shown, cable configuration element 120 depends from cover 104 and extends into enclosure volume 110 a distance $Y_d$ with the cover 104 retained in a closed position. The distance $Y_d$ may be considered the distance that cable configuration element 120 extends so as to form and retain the desired shape and downward extension of loop 122 and downwardly extending surface 121 of at least a portion of cable 118 within enclosure volume 110 when cover 104 is closed.

Furthermore, FIG. 6 illustrates other exemplary features of the present invention that assist in preventing water from migrating along cable 118 to electrical fitting 116 and device 114. For example, a splash guard element 128 may extend upwardly from bottom surface 124 of housing 102 and prevent or reduce the likelihood of water splashing toward electrical fitting 116 and/or device 114. In some implementations, splash guard element 128 may also support cable 118 when the cable and electrical fitting 116 are installed within enclosure volume 110 and connected with device 114. For example, splash guard element 128 extends upwardly from bottom surface 124 a distance $Y_1$. The distance $Y_2$ defines the amount of deflection of cable 118 below the bottom surface of cable configuration element 120. The length and amount of this deflection may be configured by modifying the length $Y_d$ of cable configuration element 120.

Embodiments of the present invention may provide particular dimensions for $Y_d$, $Y_1$ and $Y_2$ to achieve an acceptable downward extending surface 121 and loop 122 in cable, although other suitable configurations are also supported in a manner consistent with implementations described herein.

Cable configuration element 120, and/or splash guard element 128 in some implementations, need not retain contact with cable 118 when cover 104 is closed provided that cable 118 retains surface 121 in a downwardly extending configuration and loop 122. FIG. 6 illustrates one implementation wherein cable configuration element 120 and splash guard element 128 are not in contact with cable 118; however downwardly directed surface 121 and loop 122 of cable 118 are present and may be retained should cable 118 adjust within electrical box 100, such as if cable 118 were pulled upon or if temperature changes caused the cable to move.

It should be further noted that in the exemplary electrical box 100 illustrated in FIG. 6 an upwardly extending surface 130 is formed in cable 118 that helps prevent water migration beyond the lowest point P of cable 118, allowing gravitational forces to act upon any water migration in the direction of device 114 and electrical fitting 116 past point P. Cable configuration element 120, and as exemplified in FIG. 6, splash guard element 128 may similarly create and retain the upwardly extending surface 130 formed in cable 118 as created and retained in regard to downwardly extending surface 121 and loop 122. In some embodiments cable 118 may form a loop extending upwardly corresponding to upwardly extending surface 130.

Another exemplary feature that further assists in preventing water from migrating to electrical fitting 116 and device 114 includes inclined bottom surface 132 of housing 102. As shown in FIG. 6, inclined bottom surface 132 may incline in a direction within the enclosure volume 110 toward the device 114 and connected electrical fitting 116. Inclined bottom surface 132 prevents water migration toward device 114 and electrical fitting 116, similar in functionality to the upward directed surface 130, by directing water flow away from device 114 and electrical fitting 116 and in the direction of bottom surface 124 and openings 126. Inclined bottom surface 132 allows gravitational forces to work against water migration in the direction of device 114 and electrical fitting 116 along the inclined bottom surface 132. Accordingly, openings 126 and inclined bottom surface 132 may further aid in draining water from enclosure volume 110.

Figure 7:
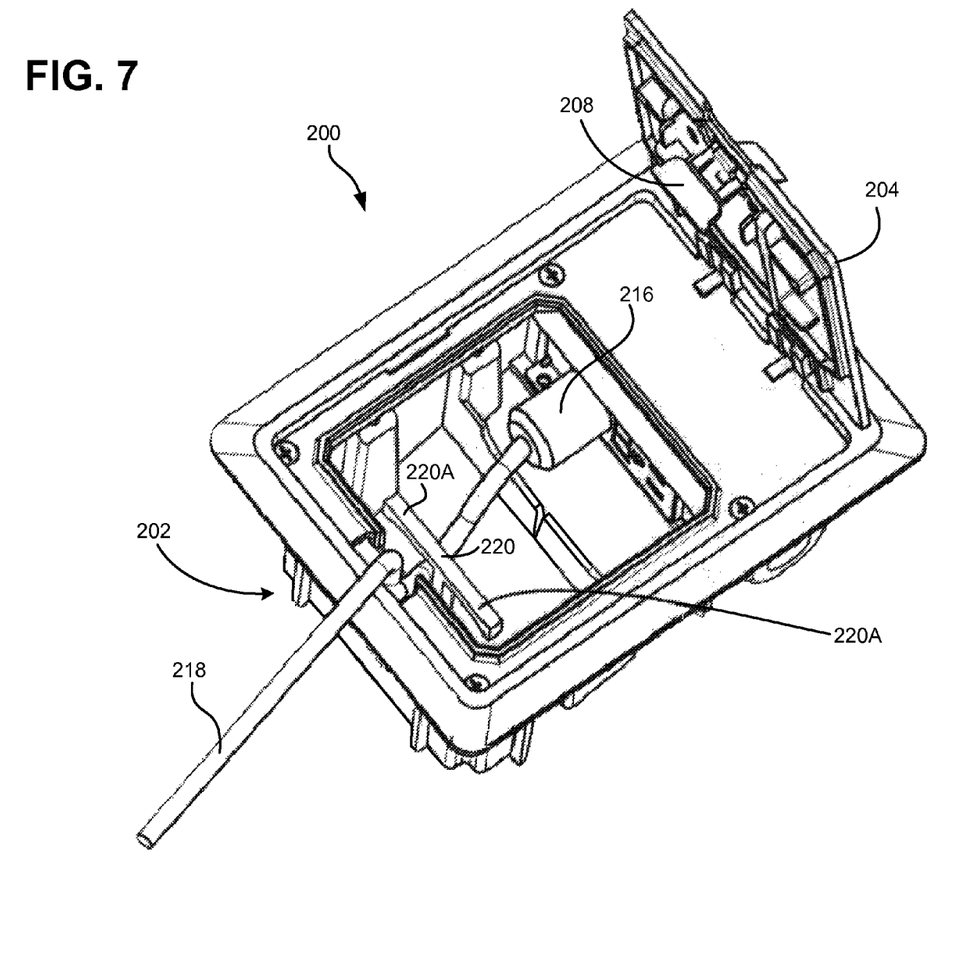
FIG. 7 is an isometric view of a second exemplary electrical box with the cover open.
Figure 8:
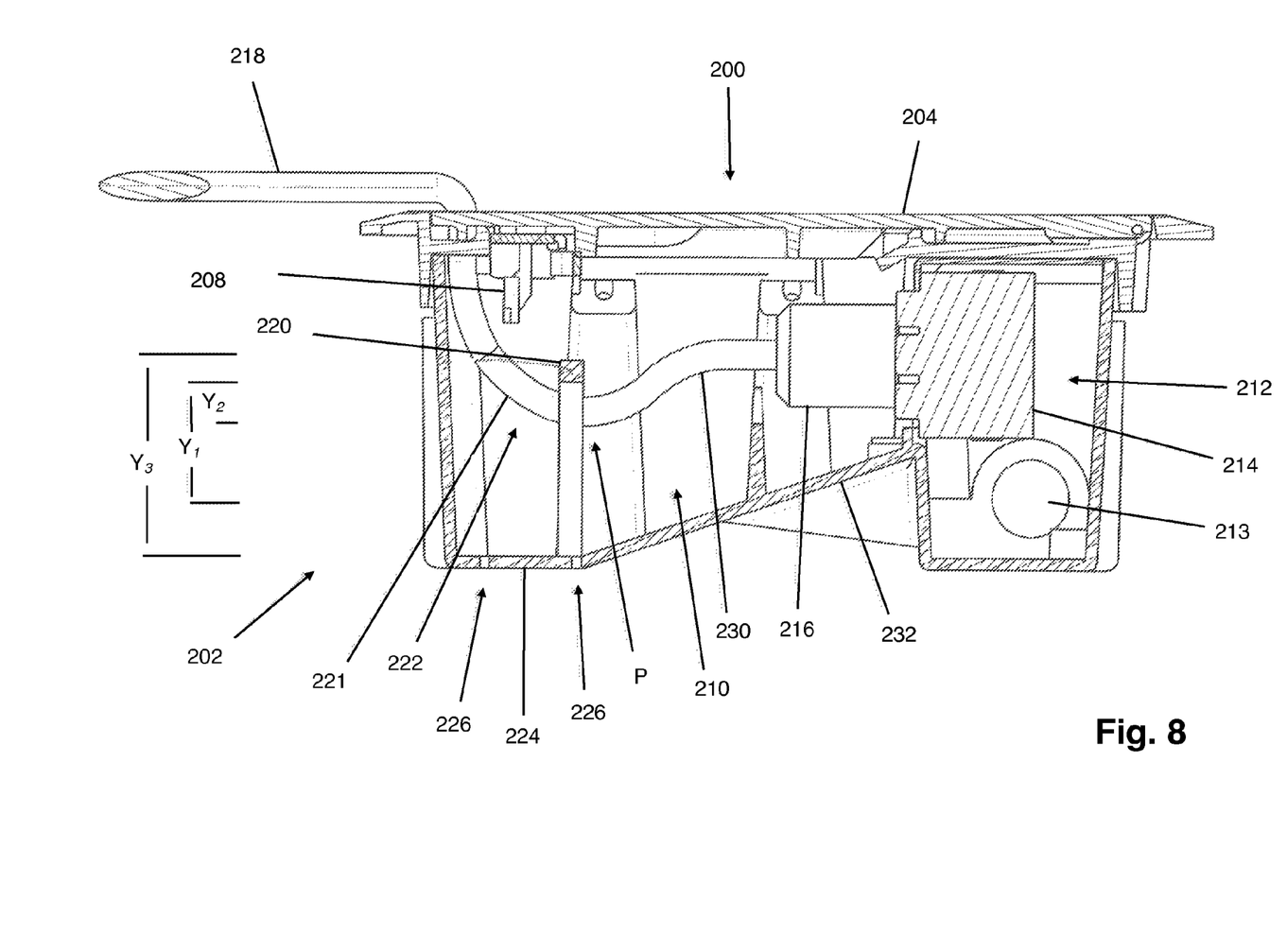
FIG. 8 is a cross sectional view of the electrical box of FIG. 7.

An alternative embodiment is illustrated in FIGS. 7 and 8 as electrical box 200 having housing 202 and another implementation of the cable configuration element of FIGS. 1 through 6. Many of the features previously described in relation to the embodiment of FIGS. 1 through 6 are also applicable to the embodiment of FIGS. 7 and 8.

As shown in FIGS. 7 and 8, a cable configuration element 220 may be provided to facilitate the dripping, collection, and flow of water out of enclosure volume 110 due, at least in part, to water migration along cable 118. Cable configuration element 220 aids in preferably creating and maintaining downwardly extending surface 221 and loop 222 in cable 218 and helps to further retain the cable in the loop configuration. For example, cable configuration element 220 may create and maintain loop 222 and downwardly extending surface 221 of cable 218, independent of cover 104. In some implementations cable configuration element 220 may have one or more retaining elements 220A that may comprise a hook or other retaining shape or function for retaining loop 222 in cable 218. As shown, in some embodiments, cable configuration element 220 may comprise a substantially T-shaped configuration, including retaining elements 220A.

As illustrated in FIG. 8, cable configuration element 220 extends from, and in some implementations is integral with, housing 202 and extends into enclosure volume 210 upwardly from bottom surface 224 of housing 202. In one implementation, cable configuration element 220 may extend upwardly from bottom surface 224 of housing 202 and into enclosure volume 210 a distance $Y_3$ sufficient to retain a portion of cable 218 to form loop 222. Loop 222 and downwardly extending surface 221 may be retained in the preferred shape and configuration illustrated in FIGS. 7 and 8 by cable configuration element 220 so that a portion of cable 218 extends below a retaining element 220A of cable configuration element 220. A portion of the cable length of cable 218 may be made to extend below retaining element 220A either prior to connecting electrical fitting 216 with device 214 or after connection by adjusting a portion of cable 218 to extend below a retaining element. Other configurations of cable 118 may also be formed if desired; however, having the surface 221 of cable 218 extended downwardly facilitates drip formation of water migrating along cable 218.

Exemplary distance $Y_3$ may be considered the distance that cable configuration element 220 extends so as to form and retain the desired shape and downward extension of loop 222 and downwardly extending surface 221. The distance $Y_3$ in this implementation is not defined by a closed configuration of cover 204.

As shown in FIGS. 7 and 8, a splash guard element 228 may extend upwardly from bottom surface 224 of housing 202 and may prevent or limit splashing of water toward fitting 216 and/or device 214. In some implementations, splash guard element 228 may support cable 218 when cable 218 and electrical fitting 216 are installed within enclosure volume 210 and connected with device 214. For example, splash guard element 228 in FIGS. 7 and 8 extends upwardly from bottom surface 224 a distance $Y_1$ such that the downwardly extending surface 221 of at least a portion of cable 218 will depend below the top of the splash guard element 228 a distance $Y_2$. The distance $Y_2$ that downwardly extending surface 221 of at least a portion of cable 218 will depend can be controlled by the distance $Y_3$ that cable configuration element 220 extends upwardly from bottom surface 224 and into enclosure volume 210. Embodiments of the present invention may provide particular dimensions for $Y_3$, $Y_1$ and $Y_2$ to achieve an acceptable downwardly extending surface 221 and loop 222 in cable.

Cable configuration element 220 and/or retaining elements 220A need not retain contact with cable 218 provided that cable 218 retain downwardly extending surface 221 and loop 222. FIG. 8 illustrates one implementation wherein the cable configuration element 220 and splash guard element 228 are not in contact with the cable; however downwardly directed surface 221 and loop 222 of cable 118 are present and may be retained should the cable 218 adjust within electrical box 200, such as if cable 218 were pulled upon or if temperature changes caused the cable to move.

It should be further noted that in exemplary electrical box 200 illustrated in FIG. 8, an upwardly extending surface 230 may be formed in cable 218, similar to upwardly extending surface 130 of FIG. 6, that helps to prevent water migration beyond the lowest point P of cable 218. This implementation again allows gravitational forces to act upon any water migration in the direction of device 214 and electrical fitting 216 past point P. Cable configuration element 220, and as exemplified in FIG. 8, splash guard element 228 may similarly create and retain the upward extending surface 230 formed in cable 218 as created and retained in regard to downwardly extending surface 221 and loop 222. In some embodiments the cable 218 may form a loop extending upwardly corresponding to upwardly extending surface 230.

Figure 9:
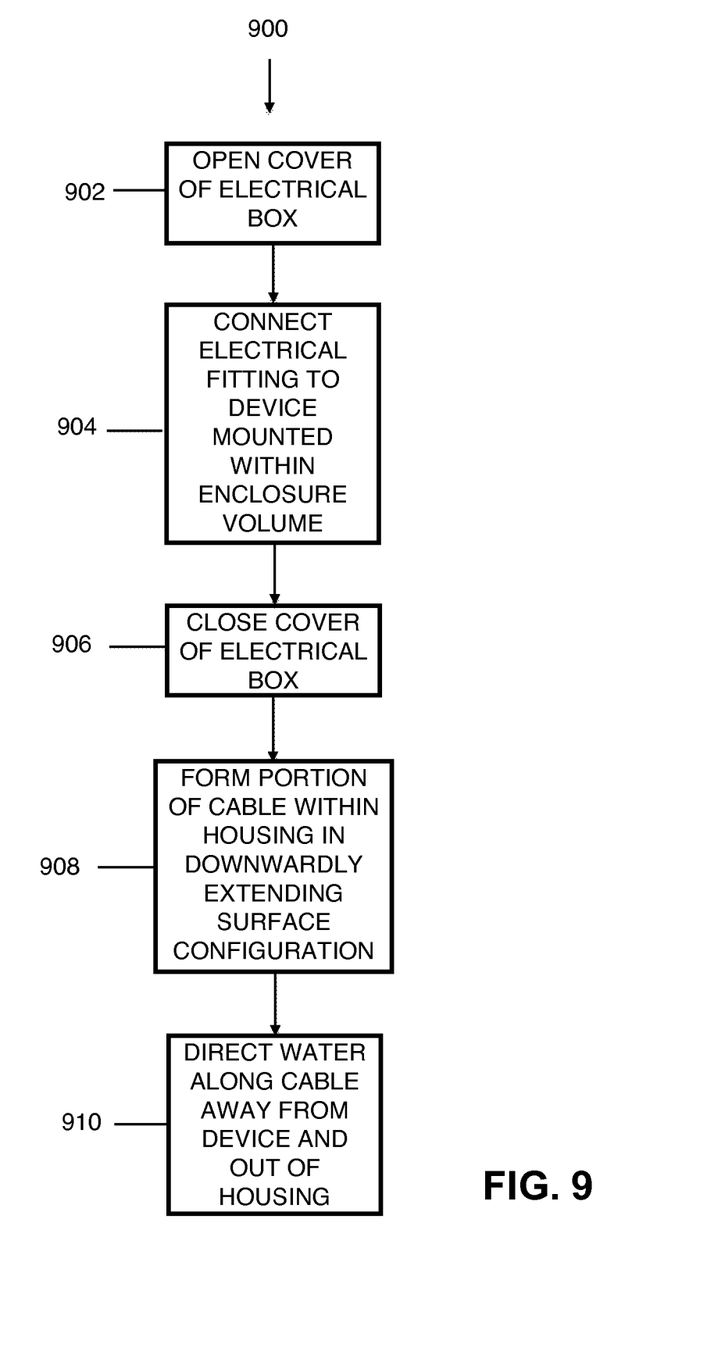
FIG. 9 is a flow diagram of a process of weatherproofing electrical devices.

FIG. 9 is a flow diagram of an exemplary process 900 of weatherproofing an electrical device. Reference is also made to FIGS. 1 through 6 in describing this implementation of weatherproofing of an electrical device. Accordingly, process 900 begins when cover 104 of electrical box 100 is opened (block 902). Electrical fitting 116 may be connected to device 114 mounted within the enclosure volume 112 of housing 102 (block 904). Cover 104 may be closed (block 906), and a portion of cable 118 within housing 102 may be formed in a downwardly extending surface configuration by cable configuration element 120 (block 908). As described above, cable configuration element 120 may project downwardly from cover 104 and may force at least a portion of cable 118 to form loop 122. More specifically, closing of cover 104 may cause a portion of cable 118 to be deflected by at least a distance $Y_d$ into volume 110. Water traveling along cable 118 may be directed away from device 114 and out of housing 112 of electrical box 100 (block 910).

Process 900 may include additional features consistent with implementations described above. For example, a downwardly extending surface configuration of a portion of cable 118 may be provided. The downwardly extending surface configuration may be provided by the closing of cover 104 and the corresponding extension downward of cable configuration element 120 into volume 110 a distance $Y_d$, thereby adjusting a portion of cable 118 below the cable configuration element 120 to create downwardly extending surface 121 and loop 122 of cable 118. In still further implementations, a user may manually form downwardly extending surface 121 and loop 122 of cable 118 prior to closing cover 104.

Figure 10:
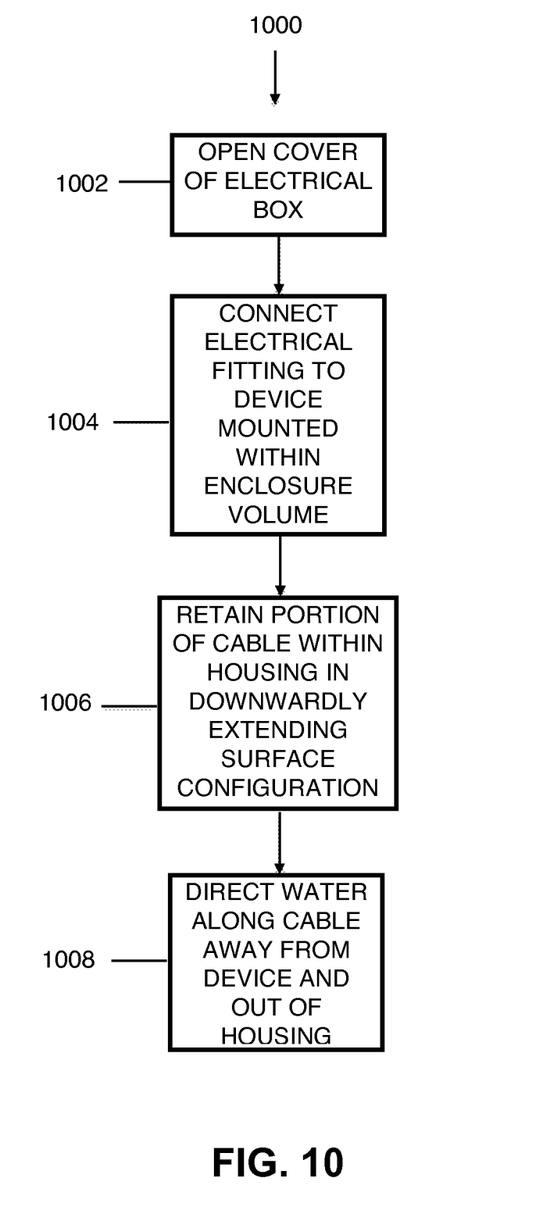
FIG. 10 is a flow diagram of a second process of weatherproofing electrical devices.

FIG. 10 is a flow diagram of an exemplary process 1000 of weatherproofing an electrical device. Reference is also made to FIGS. 7 and 8 in describing this implementation of weatherproofing of an electrical device. Accordingly, process 1000 begins when cover 204 of electrical box 200 is opened (block 1001). Next, an electrical fitting 216 may be connected to device 214 mounted within the enclosure volume 212 of housing 202 (block 1004). A portion of cable 218 may be retained within housing 202 in a downwardly extending surface configuration (block 1006). As shown in FIG. 8, the downwardly extending surface configuration may include the retention of downwardly extending surface 221 and maintenance of a loop 222 of cable 218 by cable configuration element 220, and in some implementations by retaining element 220A.

Block 1006 of process 1000 may be facilitated by a portion of the cable length of cable 218 being made to extend below retaining element 220A either prior to connecting electrical fitting 216 with device 214 or after connection by adjusting a portion of cable 218 to extend below a retaining element 220A and the extension upward of cable configuration element 220 into volume 210. Therefore the distance $Y_3$ is maintained so that the position of the portion of cable 218 retained by the cable configuration element 220 is maintained. Water traveling along cable 218 may be directed along cable 218 away from device 214 and out of housing 212 of the electrical box 200 (block 1008).

Process 1000 may include additional features consistent with implementations described above. For example, a downwardly extending surface configuration of a portion of cable 218 may be created prior to retaining cable 218 within housing 202. This step may be facilitated by a portion of the cable length of cable 218 being made to extend below retaining element 220A either prior to connecting electrical fitting 216 with device 214 or after connection by adjusting a portion of cable 218 to extend below retaining element 220A and the extension upward of cable configuration element 220 into volume 210. Therefore the distance $Y_3$ may be maintained so that adjusting the portion of cable 218 below the cable configuration element 220 creates downwardly extending surface 221 and loop 222 of cable 218. In still further implementations, a user may manually form downwardly extending surface 221 and loop 222 of cable 218 as part of the step of retaining a portion of cable 218 within housing 202 in a downwardly extending surface configuration.

The foregoing description of implementations provides illustration, but is not intended to be exhaustive or to limit the implementations to the precise form disclosed. Modifications and variations are possible in light of the above teachings or may be acquired from practice of the teachings. For example, dimensions of the elements are provided for ease of understanding, but different implementations for different applications may have different dimensions.

In addition, while series of steps have been described with regard to exemplary processes illustrated in FIGS. 9 and 10, the order of the steps may be modified in other implementations. In addition, non-dependent steps may represent features that can be performed at other points in the process, such as in parallel to other steps.

No element, act, or instruction used in the present application should be construed as critical or essential to the implementations described herein unless explicitly described as such. Also, as used herein, the article "a" is intended to include one or more items. Further, the phrase "based on" is intended to mean "based, at least in part, on" unless explicitly stated otherwise.

What is claimed is:

1. A weatherproof electrical box, comprising:
   a housing having a first enclosure volume and an opening to the first enclosure volume, wherein the housing is configured for horizontal mounting within a structure and to receive a device mounted within a vertical wall of the first enclosure volume, wherein the housing further comprises a bottom having at least one flat portion and a single inclined portion, wherein the one flat portion and the single inclined portion are underlying the device when the device is mounted within the vertical wall to direct water flow in the first enclosure volume away from the device;

a cover connected with the housing to cover the opening;

a cable configuration element extending from the cover and into the first enclosure volume, wherein the cable configuration element retains a cable connected with the device in a downwardly extending surface configuration when the cover covers the opening; and a splash guard element projecting from the single inclined portion of the bottom of the housing into the first enclosure volume, wherein the splash guard element is spaced from the cable when the cable is connected to the device.

2. The weatherproof electrical box of claim 1, wherein the downwardly extending surface configuration comprises a loop.

3. The weatherproof electrical box of claim 1, further comprising a splash guard element includes a cut out interior portion for permitting passage of the cable.

4. The weatherproof electrical box of claim 1, wherein the splash guard element limits water from splashing toward the device.

5. The weatherproof electrical box of claim 1, further comprising a cable door in the cover, wherein the cable extend from the first enclosure volume to an exterior of the housing through the cable door.

6. The weatherproof electrical box of claim 1, wherein the housing comprises a second enclosure volume environmentally isolated from the first enclosure volume, wherein the device is mounted in the second enclosure volume.

7. The weatherproof electrical box of claim 1, further comprising at least one opening in the bottom of the housing, wherein the at least one opening allows water within the first enclosure volume to flow out of the first enclosure volume.

8. The weatherproof electrical box of claim 7, wherein the single inclined portion of the bottom is configured to direct water flow in the first enclosure volume away from the device and toward the at least one opening.

9. A weatherproof electrical box, comprising:

a housing having a first enclosure volume and an opening to the first enclosure volume, wherein the housing is configured for horizontal mounting within a structure and to receive a device mounted within a vertical wall of the first enclosure volume, wherein the housing further comprises a bottom having at least one flat portion and a single inclined portion, wherein the one flat portion and the single inclined portion are underlying the device when the device is mounted within the vertical wall to direct water flow in the first enclosure volume away from the device;

a cover connected with the housing to cover the opening, wherein the housing further comprises at least one opening in the bottom of the housing to allow water within the first enclosure volume to flow out of the housing and away from the device; and a cable configuration element integrally formed with and projecting from the single inclined bottom of the housing and into the first enclosure volume, wherein the cable configuration element is configured to cause the formation of a loop in a cable connected with the device mounted in the housing, wherein the loop overlies the at least one opening in the bottom surface of the housing.

10. The weatherproof electrical box of claim 9, wherein the cable configuration element comprises a T-shaped configuration.

11. The weatherproof electrical box of claim 10, wherein the cable configuration element comprises at least one hook for retaining the cable under the cable configuration element.

12. The weatherproof electrical box of claim 9, further comprising:

a splash guard element projecting from single inclined portion of the bottom of the housing into the first enclosure volume, wherein the splash guard element is spaced from the cable when the cable is connected to the device.

13. A weatherproof electrical box, comprising:

a housing having a first enclosure volume and an opening to the first enclosure volume, wherein the housing is configured to receive a device mounted therein, wherein the housing further comprises a bottom having at least one flat portion and a single inclined portion, wherein the one flat portion and the single inclined portion are underlying the device when the device is mounted within a vertical wall of the housing to direct water flow in the first enclosure volume away from the device;

a cover connected with the housing to cover the opening;

a cable configuration element integrated with the electrical box to form a loop in a cable connected to the device to direct water flowing along the cable away from the device; and a splash guard element extending from a bottom surface of the housing and into the first enclosure volume, wherein the splash guard element limits splashing of water toward the device, and wherein the splash guard element is spaced from the cable when the cable is connected to the device.

14. The weatherproof electrical box of claim 13, wherein the housing comprises a second enclosure volume environmentally isolated from the first enclosure volume, wherein the device is mounted in the second enclosure volume.

15. The weatherproof electrical box of claim 13, wherein the cable configuration element extends from the cover and into the first enclosure volume.

16. The weatherproof electrical box of claim 13, wherein the housing further comprises at least one opening in a bottom surface of the housing to allow water within the first enclosure volume to flow out of the housing and away from the device.

17. The weatherproof electrical box of claim 13, wherein the cable configuration element is integrally formed with and projects from the bottom surface of the housing and into the first enclosure volume.

18. The weatherproof electrical box of claim 17, wherein the cable configuration element comprises a T-shaped configuration.

19. The weatherproof electrical box of claim 18, wherein the cable configuration element comprises at least one hook for retaining the cable under the cable configuration element to form the loop in the cable.

* * * * *

UNITED STATES PATENT AND TRADEMARK OFFICE
CERTIFICATE OF CORRECTION

| | |
|---|---|
| PATENT NO. | : 9,077,166 B2 |
| APPLICATION NO. | : 13/072829 |
| DATED | : July 7, 2015 |
| INVENTOR(S) | : Cong Thanh Dinh |

It is certified that error appears in the above-identified patent and that said Letters Patent is hereby corrected as shown below:

In the claims

Claim 5, at column 9, lines 28-29 should read: "The weatherproof electrical box of claim 1, further comprising a cable door in the cover, wherein the cable extends"

Signed and Sealed this
Tenth Day of November, 2015

Michelle K. Lee
*Director of the United States Patent and Trademark Office*